United States Patent
Misch et al.

(10) Patent No.: US 8,204,908 B2
(45) Date of Patent: Jun. 19, 2012

(54) TEAM SUPPORT IN CHANGE RECORDING AND VERSIONING SYSTEMS

(75) Inventors: Frank Misch, Heidelberg (DE); Karin Sudrow, Weinheim (DE)

(73) Assignee: SAP AG (DE)

( * ) Notice: Subject to any disclaimer, the term of this patent is extended or adjusted under 35 U.S.C. 154(b) by 266 days.

(21) Appl. No.: 12/624,702

(22) Filed: Nov. 24, 2009

(65) Prior Publication Data

US 2011/0125798 A1    May 26, 2011

(51) Int. Cl.
*G06F 17/30* (2006.01)

(52) U.S. Cl. ........ 707/783; 707/612; 707/625; 707/784; 707/785; 707/786; 707/787; 707/788

(58) Field of Classification Search ............... 707/625, 707/612, 783–788
See application file for complete search history.

(56) References Cited

U.S. PATENT DOCUMENTS

| | | | | |
|---|---|---|---|---|
| 5,706,509 A * | 1/1998 | Man-Hak Tso | ............... | 707/625 |
| 6,061,684 A * | 5/2000 | Glasser et al. | ......................... | 1/1 |
| 6,625,621 B2 * | 9/2003 | Tan et al. | .............................. | 1/1 |
| 7,127,460 B2 * | 10/2006 | Nixon et al. | ........................... | 1/1 |
| 7,743,018 B2 * | 6/2010 | Chakra et al. | ................. | 707/609 |
| 7,765,128 B2 * | 7/2010 | Brooks et al. | ................ | 705/26.1 |
| 7,984,426 B2 * | 7/2011 | Loff | .............................. | 717/121 |
| 2003/0004952 A1 * | 1/2003 | Nixon et al. | ..................... | 707/10 |
| 2005/0181789 A1 * | 8/2005 | Yach et al. | ..................... | 455/433 |
| 2007/0100647 A1 * | 5/2007 | Dekel et al. | ......................... | 705/1 |
| 2009/0205037 A1 * | 8/2009 | Asakura | ......................... | 726/10 |
| 2010/0125471 A1 * | 5/2010 | Wang et al. | ......................... | 705/7 |
| 2010/0125549 A1 * | 5/2010 | Wang et al. | ................... | 707/612 |
| 2011/0078658 A1 * | 3/2011 | Misch et al. | ................... | 717/121 |
| 2011/0093098 A1 * | 4/2011 | Kostadinov et al. | ............ | 700/87 |

OTHER PUBLICATIONS

P. Leszek, "Sharing code with the Eclipse Platform: Sharing source code within a team project," IBM, Mar. 13, 2003, 12 pages.

Smart Development Environment for Visual Studio (SDE-VS) User's Guide (Part 1), Chapter 14—Team Collaboration with CVS Repository, Aug. 4, 2007, pp. 14-2-14-22.

* cited by examiner

*Primary Examiner* — Frantz Coby

(74) *Attorney, Agent, or Firm* — Fish & Richardson P.C.

(57) ABSTRACT

Implementations of the present disclosure provide computer-implemented methods including generating a changelist corresponding to at least one computer code object that is digitally stored in a repository database, assigning a team to the changelist, the team comprising a plurality of members, initiating access to the computer code object using a computer that is in communication with the repository database, enabling access to the computer code object when a user of the computer is a member of the team, and prohibiting access to the computer code object when the user of the computer is not a member of the team.

21 Claims, 7 Drawing Sheets

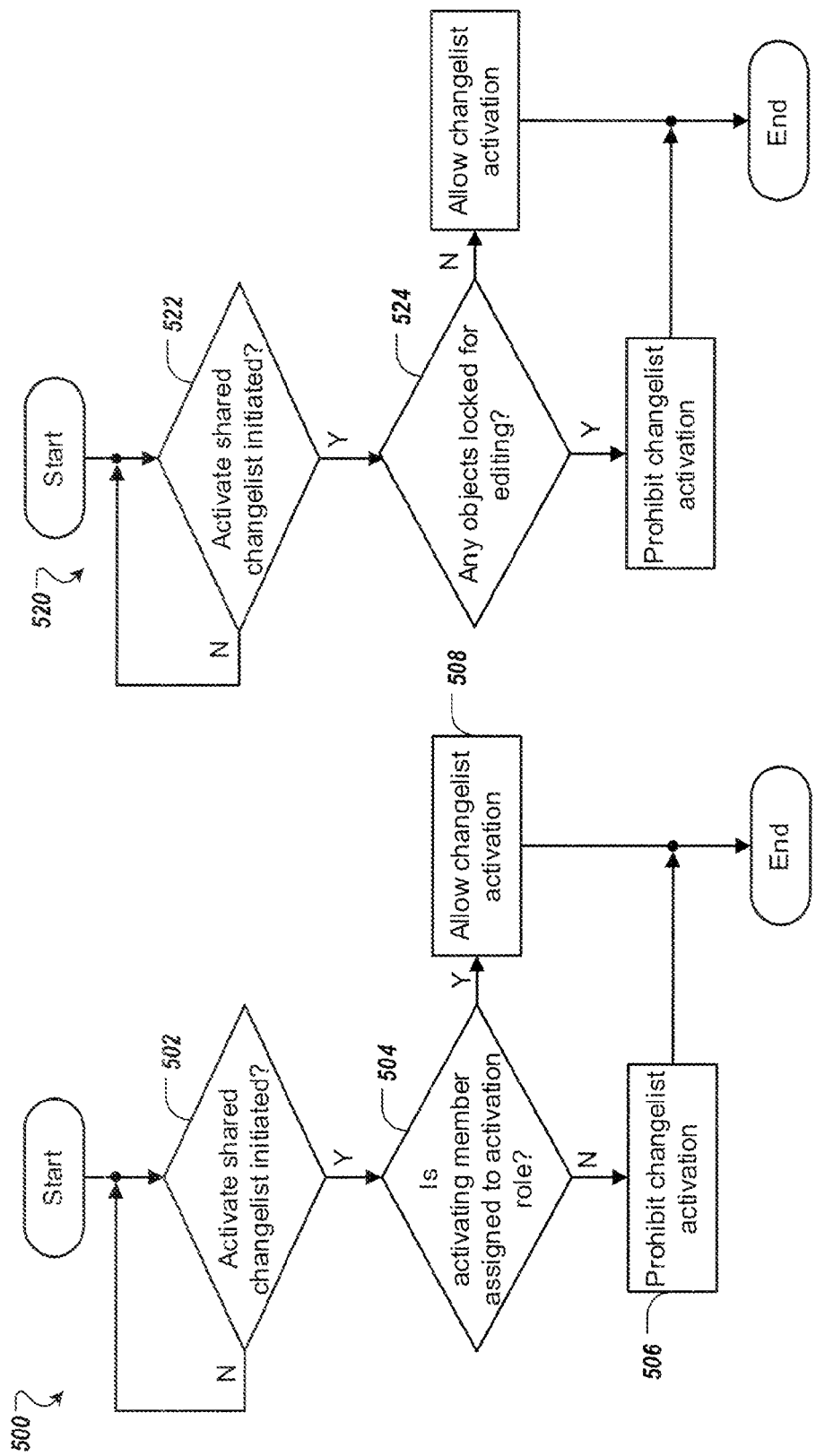

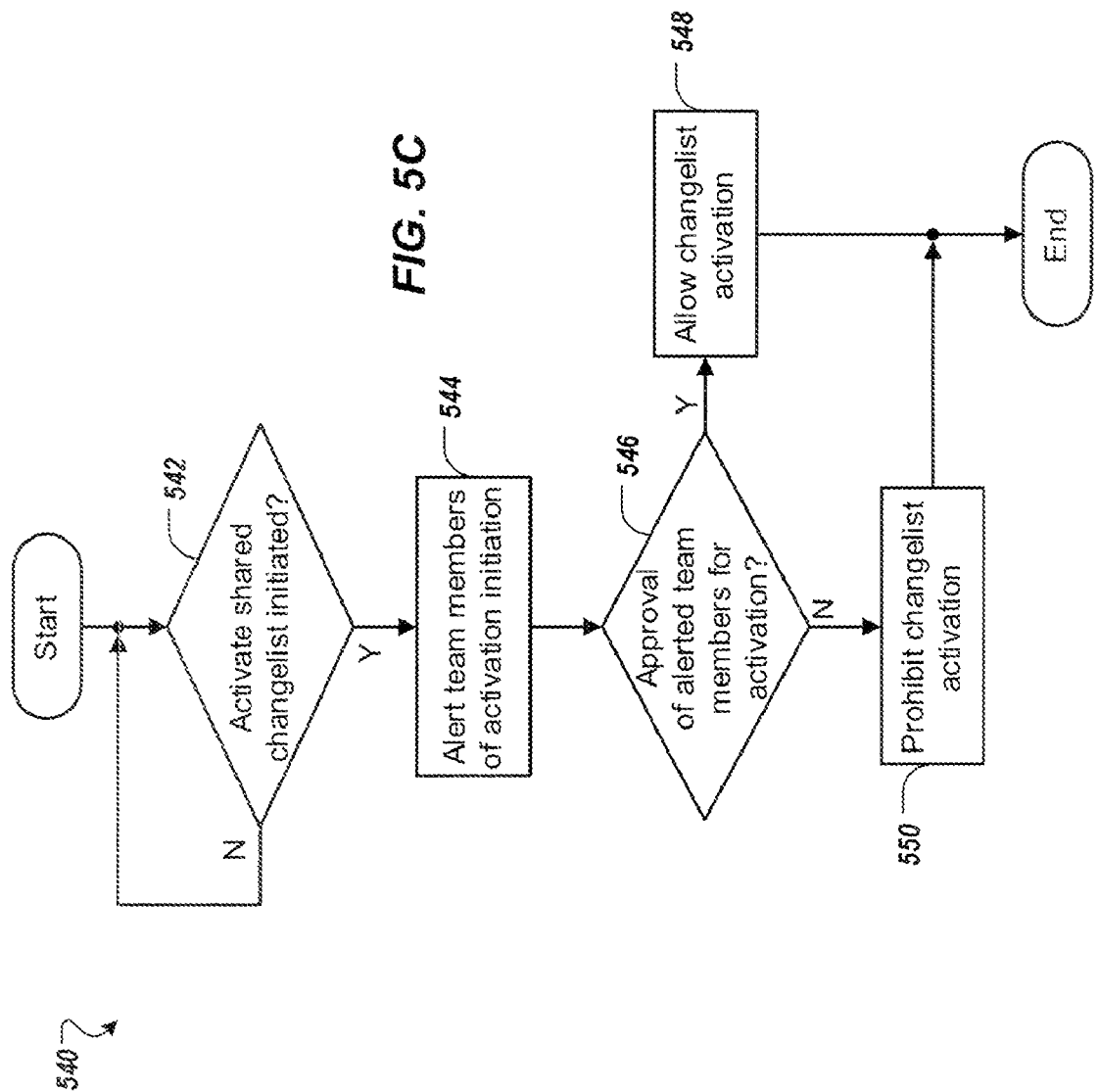

TEAM SUPPORT IN CHANGE RECORDING AND VERSIONING SYSTEMS

BACKGROUND

An organization that performs software development can use software configuration management (SCM) to track and control changes in a software project during the software development process. SCM can identify the functional and physical attributes of the software components (e.g., source code files or modules) for the software project at various points in time. SCM can also manage changes to identified attributes of the software components in order to maintain integrity and traceability for the software project throughout the entire software development process.

A SCM system can include revision control. Revision control can track and manage changes to software components. A SCM system that includes revision control can manage software component changes in an environment where the software development is by a team of developers where each member of the team can access and share each software component.

A SCM system can implement revision control using a change recording system or a versioning system. For example, a change recording system can record changes made by developers to software components, keeping track of the changes made on a particular software component, at a specific time by a specific developer. For example, a versioning system can store versions of a software component after each recorded change by a developer. A change recording system may not provide previous versions of the software component as it only maintains a sequential list of changes made to the software component. A versioning system can provide previous versions of the software component.

SUMMARY

Implementations of the present disclosure provide computer-implemented methods including generating a changelist corresponding to at least one computer code object that is digitally stored in a repository database, assigning a team to the changelist, the team comprising a plurality of members, initiating access to the computer code object using a computer that is in communication with the repository database, enabling access to the computer code object when a user of the computer is a member of the team, and prohibiting access to the computer code object when the user of the computer is not a member of the team.

In some implementations, the method further includes instantiating an editor program at the computer, and modifying the computer code object using the editor program.

In some implementations, the method further includes initiating access to the computer code object using a second computer, and prohibiting access to the computer code object when the user of the computer is a member of the team and the computer code object is being accessed by another member of the team.

In some implementations, the method further includes initiating activation of the changelist, determining that a user initiating the activation is an authorized user, and activating the changelist when the user initiating the activation is an authorized user. In some implementations, the method further includes assigning a user to a role as an activation user, and determining that the user initiating the activation is an authorized user when the user is assigned as the activation user.

In some implementations, the method further includes initiating activation of the changelist by a first member of the plurality of members, alerting a second member that activation has been initiated, generating an approval signal based on an input of the second member, and activating the changelist upon generation of the approval signal.

In some implementations, the method further includes initiating activation of the changelist by a first member of the plurality of members, activating objects of the changelist that were only modified by the first member, initiating activation of the changelist by a second member of the plurality of members, activating objects of the changelist that were only modified by the second member, and activating objects of the changelist that were modified by the first and second members.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes a database having computer code stored thereon, a plurality of computers that are in communication with the database to enable respective users of the computers to access the objects, and one or more processors operable to execute instructions to cause the one or more processors to perform operations in accordance with implementations of the methods provided herein.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 5A-5C are flowcharts illustrating exemplar steps that can be executed to activate changelists in accordance with implementations of the present disclosure.

Like reference symbols in the various drawings indicate like elements.

DETAILED DESCRIPTION

Figure 1:
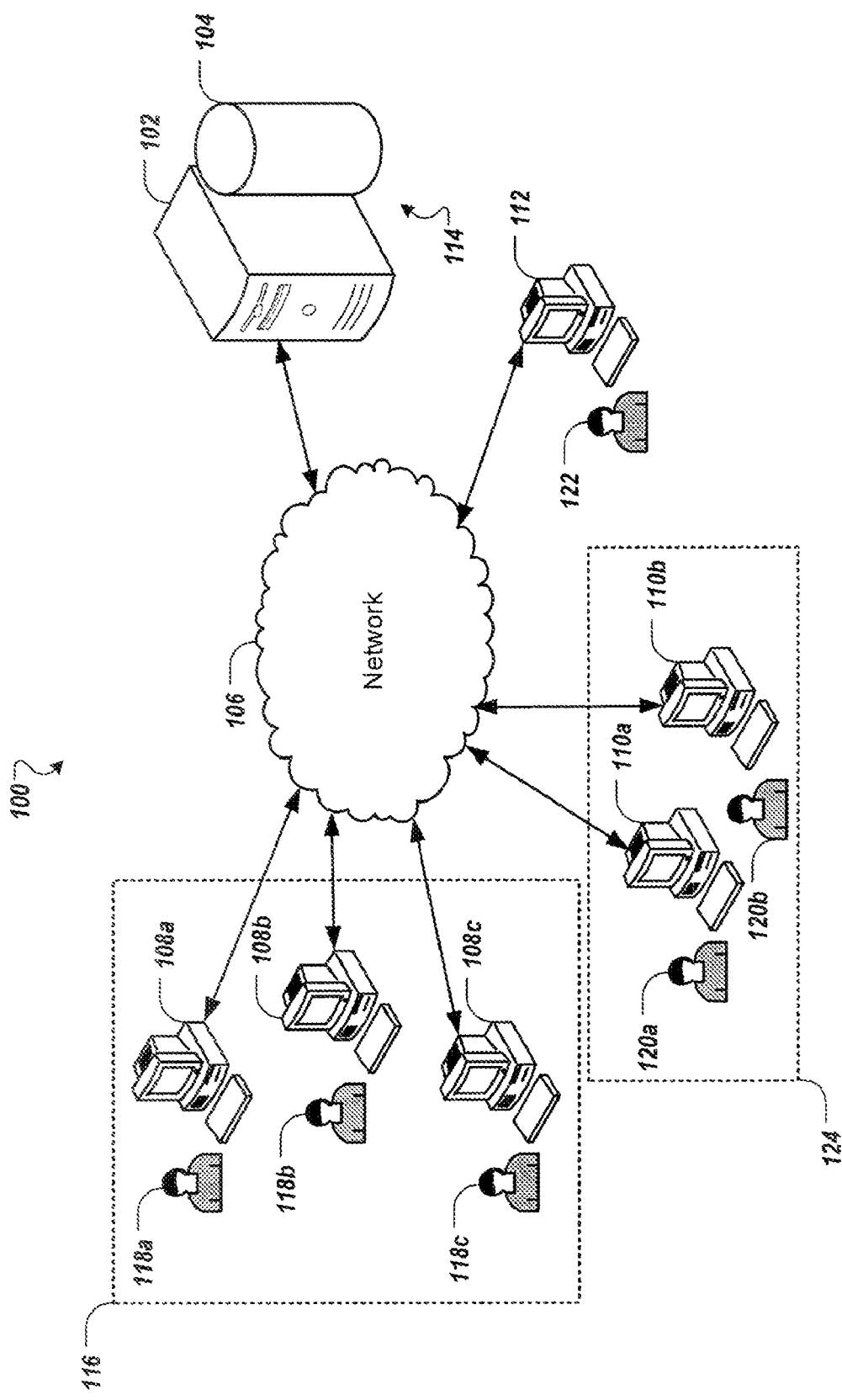
FIG. 1 is a schematic illustration of an exemplar system architecture in accordance with implementations of the present disclosure.

Referring now to FIG. 1, a schematic illustration of an exemplar system 100 in accordance with implementations of the present disclosure can include a plurality of clients 108a-c, 110a-b, 112 and a computer system 114. The computer system 114 can include an application server 102 and a database 104. The computer system 114 and the clients 108a-c, 110a-b, 112 can be connectively coupled for communication over a network 106.

In some implementations, the system 100 can be a distributed client/server system that spans one or more networks such as network 106. In some implementations, each client (e.g., clients 108a-c, 110a-b, 112) can communicate with the application server 102 via a virtual private network (VPN), Secure Shell (SSH) tunnel, or other secure network connection. In some implementations, the network 106 can include the Internet, a wireless service network and may also include the Public Switched Telephone Network (PSTN). In other implementations, the network 106 may include a corporate network (e.g., an intranet) and one or more wireless access points.

Each client (e.g., clients 108a-c, 110a-b, 112) can establish its own session with the application server 102. Each session can be semi-permanent as it can be established at one point in time and torn down at another. Each session can involve two-way information exchange between the computer system 114 and each individual client 108a-c, 110a-b, 112. For example, a Hypertext Transfer Protocol (HTTP) session can allow the association of information with individual users. A session can be stateful where at least one of the communicating parts (e.g., the application server 102 or the client (e.g., clients 108a-c, 110a-b, 112)) can save information about the session history in order to be able to communicate. Alternatively, stateless communication includes independent requests with associated responses.

Multiple clients (e.g., clients 108a-c, 110a-b, 112) can communicate via network 106 with the application server 102. In order to run an application each client (e.g., clients 108a-c, 110a-b, 112) can establish a corresponding session with the application server 102. For example, the database 104 can store software components for a software development project in a central repository. An application server (e.g., application server 102) can host a software configuration management (SCM) application. Use of the SCM application by developers working on a software project can prevent multiple developers from accessing and editing the same source code module in the central repository at the same time. For example, a software module can be a source code file that can include one or more software objects. For example, developers (e.g., developers 118a-c, 120a-b, 122) using a plurality of clients (e.g., clients 108a-c, 110a-b, 112, respectively) can run the SCM application on the application server 102 to access source code modules stored in a central repository in the database 104.

In some implementations, the SCM application can allow a first developer to lock a source code module in the central repository for editing (e.g., check-out). If a first developer checks out a source code module, no other developer can obtain write access to the source code module. A developer can check-out a source code module, which places a working copy of the source code module in the central repository on the developer's client. Other developers may read the source code module in the central repository but other developers cannot change the source code module. Once the first developer unlocks the module (e.g., either checks in the source code module, which may be an updated version of the module, or performs an undo of the check-out where the source code module in the central repository remains unchanged) other developers can access the module. In this type of SCM application, only one developer at a time can edit a source code module in the central repository.

In some implementations, a SCM application can allow multiple developers to edit the same source code module in the central repository at the same time (e.g., multiple developers can check-out the same source code module from the central repository). A first developer can check-out a source code module (e.g., a copy of the source code module in the central repository can be downloaded to the first developer's local client (e.g., client 108a) and used by the first developer as a working copy of the source code module). A second developer can check-out a source code module (e.g., a copy of the source code module in the central repository can be downloaded to the second developer's local client (e.g., client 110a) and used by the second developer as a working copy of the source code module). A first developer can check-in the changes made to the local copy of the source code module to the central repository. The SCM application can include functions to allow the second developer, also editing the source code module, to check-in their local changes to the source code module by merging their changes into the source code module in the central repository (where the source code module in the central repository now includes changes made by the first developer). The SCM application can preserve changes made to the source code module by the first developer when incorporating the changes made to the source code module by the second developer.

In some implementations, a source code module or file can include one or more software objects (computer code objects). A developer or team of developers can design and implement the software objects. Examples of software objects can include, but are not limited to, code files, configuration objects, internet content and security roles. Each software object can have a unique name. The object can store its state in fields or variables and expose its behavior through methods or functions. Objects allow for data encapsulation and can be used in object-oriented programming.

A changelist, which can also be referred to as activities, can identify a group or set of changes made by a developer to local copies of source code files at a single check-in. The changelist can include the changes made by the developer on the local copies of the source code files from check-out of the files until check-in of the files. The developer can collect changes made to the local copies of the source code files in the changelist. When the developer determines the source code changes are consistent and available for sharing with other developers, the developer can check-in the source code files, which submits the changes to the files to the SCM application. The SCM application can use the changelist to incorporate the changes made by the developer in the local copies of the source code files into the corresponding source code files in the central repository.

In some implementations, the SCM application, when using a versioning system for revision control, can save a version of a source code file on the local client responsible for the check-out of the file after each developer operation on the source code file. The changelist can represent a sequential view of source code edits by the developer. The SCM application can view a historical version of the source code at a particular time during the editing of the file using a changelist identification (ID).

In some implementations, the SCM application can sequentially record the changes made to the source code file by the developer in the changelist when using a change recording system for revision control. The changelist can represent a sequential list of source code edits made by the developer. When the developer checks in the source code file, the SCM application can proceed sequentially through the changelist to produce a modified version of the source code file for check-in. In some implementations, the changelist can include a sequential list of the differences or deltas between the local copy of the source code file and the source code file in the central repository as the developer edits the file. When the developer checks in the source code file, the SCM application can proceed sequentially through the changelist to produce the modified version of the source code file for check-in.

For example, a developer (e.g., developer 118a), using a local client (e.g., client 108a) can connect to an application server (e.g., application server 102) by way of a network (e.g., network 106). The developer (e.g., developer 118a) can run a SCM application hosted on the application server (e.g., application server 102). The developer (e.g., developer 118a) can check-out a source code file for editing, (the SCM application can download a copy of the source code file from the central repository (e.g., database 104) to the local client (e.g., client 108a)). Upon initial check-out, the SCM application can generate a changelist. In some implementations, the SCM application can place the changelist on the developer's local client (e.g., client 108a) in a local changelist file. In some implementations, the SCM application can place the changelist on the application server (e.g., application server 102) in a changelist file. For example, the SCM application can set the owner attribute in the changelist to the developer (e.g., developer 118a).

SCM applications that allow atomic multi-change check-ins can rely on changelists to maintain a central repository in a consistent state. For example, if an operation on the central repository is interrupted before completion, the changelist can ensure that the repository will not be left in an inconsistent state.

In some implementations, a SCM application can include an implementation of revision control that uses a change recording system. When a first developer checks in the source code module, the SCM application can implement the recorded changes to the source code module resulting in a revised source code module for check-in. In the SCM application, developers can edit source code modules serially. In the SCM application, a first developer can check-out a source code module. Once the module is checked out, no other developers can check-out or edit the source code module. The source code module can be available to other developers for check-out after the first developer checks in the source code module.

In some implementations, a SCM application can include an implementation of revision control that uses a versioning system. When a developer checks in the source code module, the SCM application can replace the copy of the source code module in the central repository with the most recent version of the source code module modified by the developer. In the SCM application, developers can check-out and modify source code modules concurrently. As developers check-in the source code modules, the SCM application can merge changes into the existing source code modules in the central repository.

In some implementations, a group or team of developers can access and share source code modules on a software development project. In some implementations, specific groups or teams of developers may be responsible for a specific function in a software development project (e.g., file handling, user interface, web page design, etc.). In some implementations, the team of developers can be located proximate to one another. In some implementations, the team of developers may be dispersed among multiple physical locations. In some implementations, the team may include a single developer.

In the example in FIG. 1, a development team 116 can include developers 118a-c. Each developer 118a-c can use clients 108a-c, respectively, to access the application server 102. Each developer 118a-c can execute the SCM application on the application server 102 to access source code modules stored in the central repository in the database 104. Another development team 124 can include developers 110a-b. Each developer 110a-b can use clients 120a-b, respectively, to access the application server 102. Each developer 120a-b can execute the SCM application on the application server 102 to access source code modules stored in the central repository in the database 104. A single developer 122 can use client 112 to access the application server 102. The developer 122 can execute the SCM application on the application server 102 to access source code modules stored in the central repository in the database 104.

Implementations of the present disclosure provide development team support in a SCM application for revision control. In some implementations, a development team may want to modify source code files concurrently. As described above, in a SCM application that uses a change recording system for revision control, a single developer at a time can check-out a source code file. When a developer checks out a source code file, additional developers cannot check-out the source code file until the current developer checks in the source code file. This results in sequential file modifications in a development process (serial development). Therefore, the development team cannot modify the same source code files concurrently.

In a SCM application that uses a versioning system for revision control, multiple developers can check-out a source code file. For example, a first developer may check-out a source code file. A second developer can check-out the same source code file with the knowledge that a previous developer has checked out the source code file (parallel check-out) and that all changes will be merged at check-in. Therefore, the versioning system can perform parallel file modifications in a development process and file merging at check-in (concurrent development). The development team can modify the same source code files concurrently. However, the versioning system for revision control may require additional resources as compared to a change recording system.

A central repository included in a database (e.g., database 104) can include all source code files needed for a software development project. In some implementations, the database (e.g., database 104) can include a persistent list of developers that are allowed access to the source code files in the central repository (e.g., a list of developers that can check-out the files in the central repository). As described above, developers can be grouped into development teams. For example, a development team of web page designers can be grouped together in a web page design group responsible for the web page design code in the software development project.

A SCM application can use a modified change recording system for revision control that allows a development team to perform concurrent development on source code files in the central repository. For example, a system administrator for a source control management system that includes the SCM application can create and name one or more development teams. The system administrator can assign persistent members to each of the development teams. The system administrator can assign individual developers to one or more development teams. A persistent list of the development teams and the developers assigned to each development team can be included in a database (e.g., database 104) included in a computer system (e.g., computer system 114) that includes an application server (e.g., application server 102) that can execute the SCM application that includes the modified change recording system. Each individual developer can check-out any of the source code files they are allowed to access in the central repository. As described above for a change recording system, all developers can perform sequential file modifications in the development process (serial development). Additionally, team members on a development team can perform a modified version of concurrent development on source code files checked out by any member of the development team.

For example, a developer (e.g., developer 118*a*) who is a member of a development team (e.g., development team 116), using a local client (e.g., client 108*a*) can connect to an application server (e.g., application server 102) by way of a network (e.g., network 106). The developer (e.g., developer 118*a*) can run a SCM application hosted on the application server (e.g., application server 102). The SCM application can use a modified change recording system for revision control. The developer (e.g., developer 118*a*) can check-out a source code file for editing. Since the developer (e.g., developer 118*a*) is a member of a development team (e.g., development team 116), the SCM application can generate a changelist where the owner attribute is set to the name or other form of identification (e.g., numeric or alpha-numeric value) for the development team (e.g., development team 116 can be named "Team A" or development team 116 can be designated as "DT1"). In short, the particular development team is assigned ownership of the particular changelist. This can allow the developers (e.g., developers 118*a-c*) on the development team (e.g., development team 116) to work in the same object space and share the same changelist. The shared changelist can provide information to all team members (e.g., developers 118*a-c*) regarding what source code files are checked out by which members of the development team (e.g., development team 116).

For example, the SCM application can provide a copy of the source code file from the central repository in a database (e.g., database 104) to a development team repository in a database (e.g., database 104) at the initial check out of a source code file by a member of a development team (e.g., developer 118*a*). The shared changelist can be located in the development team repository in a changelist file. This can allow all development team members (e.g., developers 118*a-c*) access to the shared changelist and any source code files for sharing.

For example, a first developer (e.g., developer 118*a*) can check-out a first source code file. Knowing the development team (e.g., development team 116) the first developer (e.g., developer 118*a*) is a member of, the SCM application can place a copy of the first source code file in the development team repository from the central repository. The first developer (e.g., developer 118*a*) can use an editor, executing on the local client (e.g., local client 108*a*), in order to modify the first source code file. A second developer (e.g., developer 118*b*) who is also a member of the same development team (e.g., development team 116) can check out a second source code file. Knowing the development team (e.g., development team 116) the second developer (e.g., developer 118*b*) is a member of, the SCM application can place a copy of the second source code file in the development team repository from the central repository. The SCM application can update and maintain the shared changelist file accordingly. The second developer (e.g., developer 118*b*) can use an editor, executing on the local client (e.g., local client 108*b*), in order to modify the second source code file.

If a third developer, who is a member of a second development team (e.g., developer 120*a* in development team 124), attempts to check-out the first source code file, this action will be prohibited because the first source code file is already checked out by the first developer (e.g., developer 118*a*) on the first development team (e.g., development team 116). The SCM application that uses a modified change recording system for revision control will not allow a non-development team member to check-out and in any other way modify a source code file that is checked out by another developer (e.g., developer 118*a*) on a different development team (e.g., development team 116). Therefore, a developer belonging to a development team can have an exclusive check-out of a source code file unless the developer who is attempting the check-out of the same source code file is a member of the same development team.

If a fourth developer who is a member of the same development team as the first developer (e.g., developer 118*c* in development team 116) attempts to check-out the first source code file, they will be given permission to access the file in the shared development team repository. This can occur if the first developer (e.g., developer 108*a*) does not have the first source code file locked for editing. Therefore, the SCM application that uses a modified change recording system for revision control can allow more than one developer on a development team to sequentially edit a source code file during a single check-out of the file. Due to the sequential editing, the SCM application need not perform merging of different edited versions of the same source code file at check-in. However, multiple developers can edit the same source code file if they are on the same development team. A shared changelist can track the changes and modifications to the same source code file by a plurality of different developers on the same development team.

In some implementations, any developer who is a member of a development team can activate the shared changelist (check-in source code files). If a source code file is locked for editing by another developer on the team, the check-in will fail. Additionally, the developer that performs the check-in may need to confirm with their development team members that the source code files are in a consistent state ready for check-in prior to performing the check-in.

In some implementations, a first developer who is a member of a development team can activate the shared changelist (check-in the source code files). The check-in can occur if no other development team member has checked out or edited any source code files (the first developer is the only developer that has checked out and edited source code files). If other development team members have checked out or edited any source code files, the first developer can only initiate the check-in process. In order for the check-in process to complete, each developer who has checked out or edited any source code files (the changelist includes source code objects touched or modified by more than one development team member) has to agree to the check-in process. For example, when the first developer activates the shared changelist, the SCM application can send a check-in request to each developer in the development team. Alternatively, when the first developer activates the shared changelist, the SCM application can send a check-in request to each developer included in the shared changelist (this may be a sub-set of all the developers on the development team). Once each developer that receives a check-in request confirms the check-in, the SCM application can then activate the shared changelist (check-in the source code files).

In some implementations, a developer can be assigned the role of team list activator. The team list activator can be the only developer on a development team that can activate a changelist (check-in the source code files) if more than one developer on the development team has checked out or edited any source code files. If only a single developer on the development team has checked out source code files, the single developer, as well as the team list activator, can activate the shared changelist. In some implementations, more than one developer on a development team can be assigned the role of team list activator. The team list activator can determine from the shared changelist who the developers are on the development team that have checked out or edited source code files. For example, the team list activator can contact each developer listed in the changelist to confirm the changelist activation. In another example, the team list activator can notify all development team members of an upcoming scheduled changelist activation. Each developer with source code checked out can either complete their source code modifications or notify the team list activator of a possible conflict with the scheduled shared changelist activation.

Figure 2:
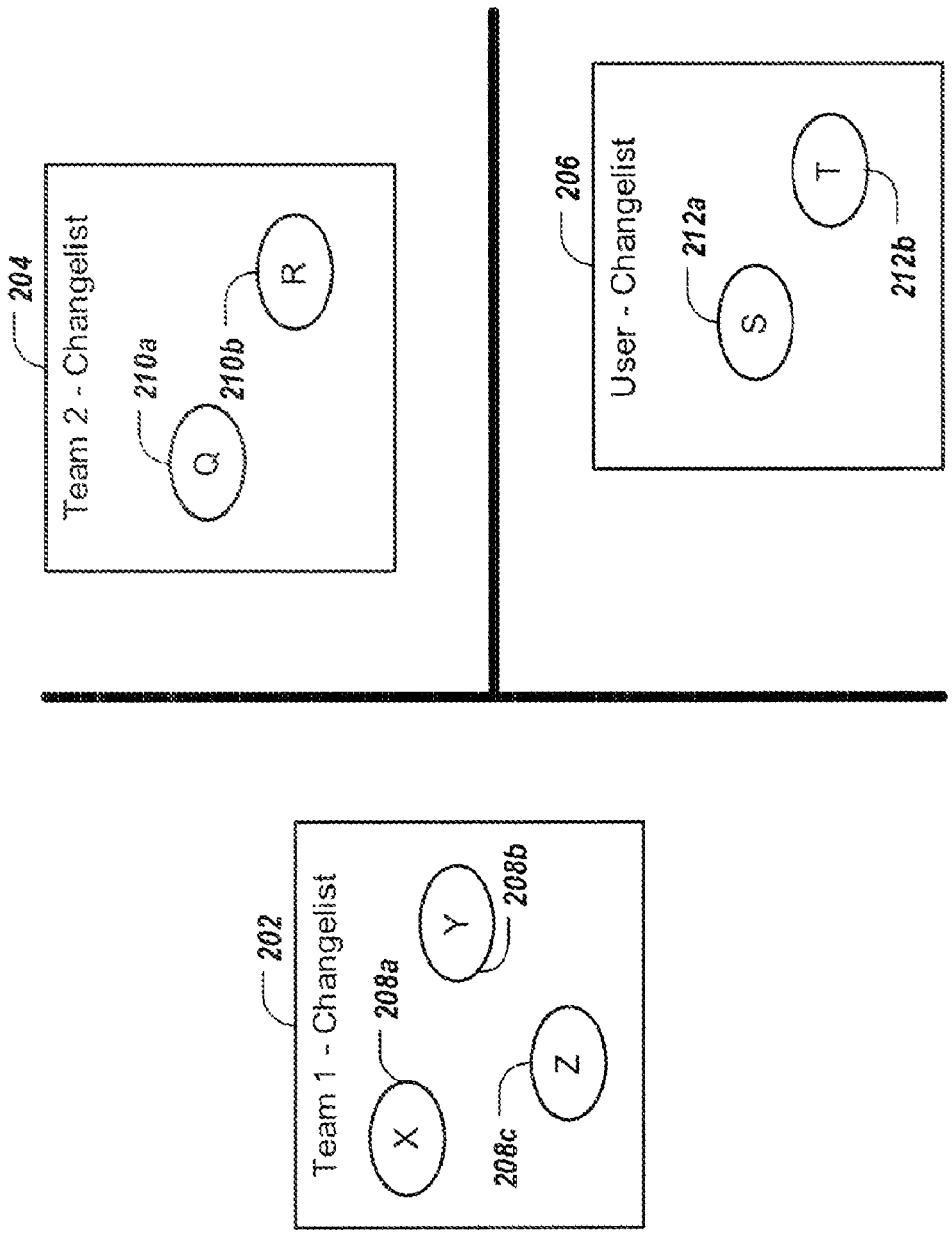
FIG. 2 is a block diagram illustrating exemplar changelists providing team support in accordance with implementations of the present disclosure.

Referring now to FIG. 2, a block diagram illustrating exemplar changelists 202, 204, 206 providing team support in accordance with implementations of the present disclosure are shown. For example, with co-reference to FIG. 1, a development team (e.g., development team 116) can be named "Team 1". A shared changelist (e.g., changelist 202) for the development team (e.g., development team 116) can include one or more source code files or software objects (e.g., source code files 208a-c). The source code files (e.g., source files 208a-c) can be checked out by any of the developers (e.g., developers 118a-c) on the development team (e.g., development team 116). For example, each developer on the development team can check-out a different source code file in the shared changelist (e.g., developer 118a can check-out source code file 208a, developer 118b can check-out source code file 208b, developer 118c can check-out source code file 208c). For example, a single developer (e.g., developer 118a) on the development team (e.g., development team 116) can check-out all source code files in the shared changelist (e.g., source code files 208a-c in changelist 202). Additionally, each developer on the development team (e.g., developers 118a-c on development team 116) can edit each source code file checked out and included in the shared changelist (e.g., source code files 208a-c in changelist 202) regardless of which developer originally checked out the source code file.

For example, with co-reference to FIG. 1, an additional development team (e.g., development team 124) can be named "Team 2". A shared changelist (e.g., changelist 204) for the development team (e.g., development team 124) can include one or more source code files or objects (e.g., source code files 210a-c). The source code files (e.g., source files 210a-c) can be checked out by any of the developers (e.g., developers 120a-b) on the development team (e.g., development team 124). For example, each developer on the development team can check-out a different source code file in the shared changelist (e.g., developer 110a can check-out source code file 210a, developer 110b can check-out source code file 210b). For example, a single developer (e.g., developer 110a) on the development team (e.g., development team 124) can check-out all source code files in the shared changelist (e.g., source code files 210a-b in changelist 204). Additionally, each developer on the development team (e.g., developers 110a-b on development team 124) can edit each source code file checked out and included in the shared changelist (e.g., source code files 210a-b in changelist 204) regardless of which developer originally checked out the source code file.

For example, a single developer (e.g., developer 122) can check-out source code files (e.g., source code files 212a-b). A changelist for the developer can include modifications made by the developer to the source code files 212a-b.

In the example in FIG. 2, developers not included on the development team cannot check out source code files included in the shared changelist of the development team. For example, developers that are members of "Team 2" (e.g., developers 110a-b on development team 124) cannot check-out or modify source code files 208a-c and source code files 212a-b. Developers that are members of "Team 1" (e.g., developers 118a-c on development team 116) cannot check-out or modify source code files 210a-b and source code files 212a-b. A single developer that is not a member of either "Team 1" or "Team 2" (e.g., developer 122) cannot check-out or modify source code files 208a-c and source code files 210a-b.

In some implementations, a developer may be a member of one or more development teams. The developer can check-out and modify source code files in each of the one or more development teams. In some implementations, if a developer is a member of "Team 1" and "Team 2", the developer can check-out and modify source code files that can be included in the shared changelist for the development team (e.g., changelist 202, changelist 204) specified by the developer at check-out. In some implementations, the developer can check-out and modify source code files that can be included in the shared changelists (e.g., changelist 202, changelist 204) for all development teams that include the developer as a member. In some implementations, a single developer can also be a member of a development team. The single developer may choose to check out and modify source code files as an individual as well as a member of a development team. The single developer may choose to check out and modify source code files as an individual only.

Figure 3:
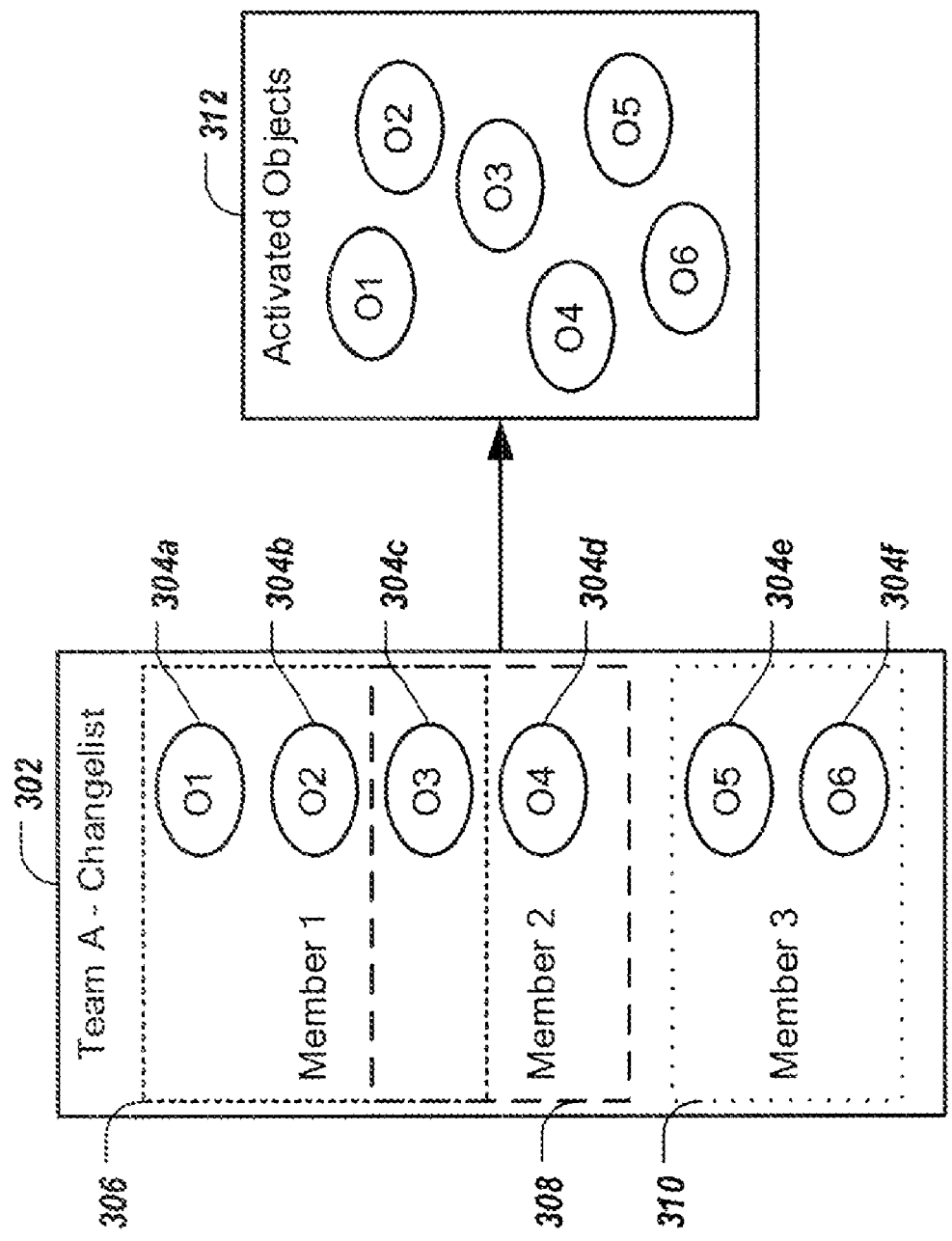
FIG. 3 is a block diagram illustrating an exemplar changelist activation in accordance with implementations of the present disclosure.

Referring to FIG. 3, a block diagram illustrating an exemplar changelist activation in accordance with implementations of the present disclosure is shown. For example, with co-reference to FIG. 1, a development team (e.g., development team 116) can be named "Team 1". A shared changelist (e.g., changelist 302) for the development team (e.g., development team 116) can include one or more source code files or objects (e.g., source code files 304a-f). As shown in FIG. 3, a first developer 306 (e.g., developer 118a) has checked out source code files 304a-c. A second developer 308 (e.g., developer 118c) has checked out source code file 304d and has additionally modified source code file 304c, checked out by the first developer 306 (e.g., developer 118a). A third developer 310 (e.g., developer 118c) has checked out source code files 304e-f.

In some implementations, the third developer 310 (e.g., developer 118c) can be assigned the role of team list activator. Before activating the shared changelist (checking in the source code files), the team list activator, third developer 310, can determine from the shared changelist 302 who the developers are on the development team that have checked out or edited source code files. For example, third developer 310 can determine that first developer 306 checked out source code files 304a-c and second developer 308 checked out source code file 304d and additionally modified source code file 304c and that as the third developer 310 source code files 304e-f were checked out. The team list activator can consult with first developer 306 and second developer 308 to determine if source code files 304a-d are available for check-in (the source code files are in a consistent stable state). Upon confirmation from the first developer 306 and the second developer 308, third developer 310, as the team list activator, can activate the shared changelist 302 (check-in source code files 302a-f) resulting in activated files 312.

In some implementations, any of the developers 306, 308, 310 who are a member of the development team ("Team A") can activate the shared changelist 302 (check-in the source code files 304a-f). It is the responsibility of the team member performing the check-in to verify with the other developers on the development team identified in the shared changelist the integrity of the source code files 304a-f prior to check-in to maintain the consistency and stability of the source code base in the central repository.

In some implementations, any of the developers 306, 308, 310 who are members of the development team ("Team A") can activate the shared changelist 302 (check-in the source code files 304a-f). For example, developer 306 can be the activator. The activator (developer 306) can request confirmation of the shared changelist activation from the other developers on the development team included in the shared changelist. Once the activator (developer 306) receives full confirmation from the additional developers, the activator (developer 306) can proceed with the shared changelist activation (the activator (developer 306) can check-in the source code files 304a-f).

If one developer attempts to check-in a source code file while another developer is editing the same source code file, the source code file will be locked for editing and the check-in will fail.

Figure 4:
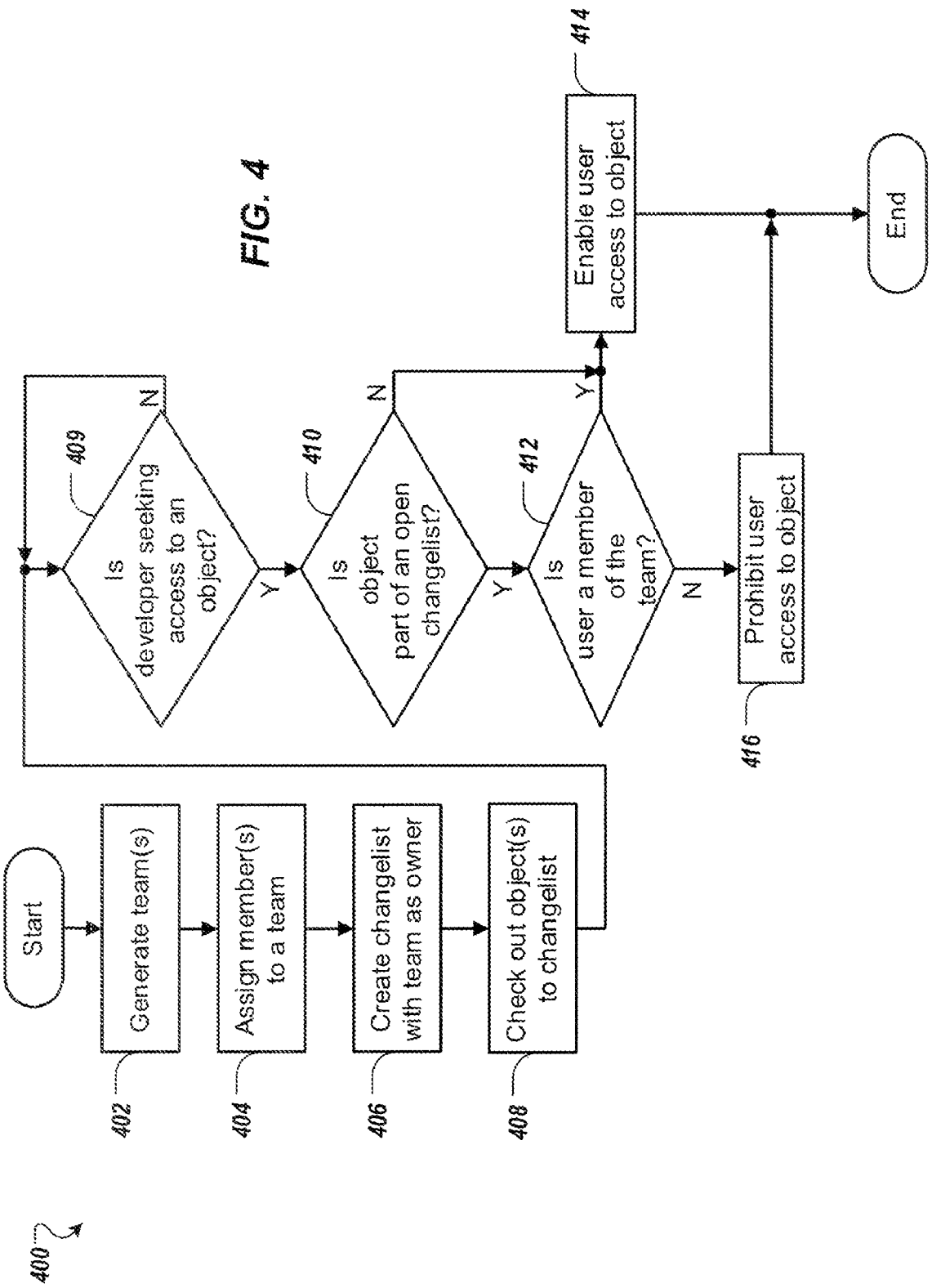
FIG. 4 is a flowchart illustrating exemplar steps that can be executed in accordance with implementations of the present disclosure.

Referring now to FIG. 4, a flowchart illustrating exemplar steps 400 that can be executed in accordance with implementations of the present disclosure are shown. For example, the exemplar steps of FIG. 4 may be implemented using software instructions stored in a computer-readable storage medium and executed by a processing system including one or more processing apparatus, or processors.

In step 402, a developer team list is generated. For example, a system administrator for a source control management system that includes a SCM application that uses a modified change recording system for revision control can create and name one or more development teams. For example, the administrator can create a development team representative of a particular design area in a software development project (e.g., a web page design team named "Team A", a graphic user interface (GUI) design team named "Team B", etc.).

In step 404, the system administrator can assign members (developers) to the development team. For example, the system administrator can assign developers involved with the web page design of a software project to the web page design team. With co-reference to FIG. 1, the web page design team (e.g., development team 116) can include developers involved with the web page design (e.g., developers 118a-c).

In step 406, a shared changelist is generated and the development team is assigned to the shared changelist. For example, the SCM application can generate a shared changelist where the owner attribute is set to the name of the development team (e.g., "Team A"). This can allow the developers (e.g., developers 118a-c) on the development team (e.g., development team 116) to work in the same object space and share the same changelist. In step 408, one or more team members (developers) can check out one or more source code files or objects.

In step 409, the process waits for a first developer to seek access to a file. For example, a first developer using a local client can connect to an application server by way of a network. The first developer can run a SCM application that uses a modified change recording system for revision control hosted on the application server. The first developer can attempt to check-out a source code file for editing.

If in step 409, the first developer attempts to check-out a file, in step 410 the SCM application checks to see if the file selected for check-out by the first developer is included in an open changelist. If the file is not included in an open changelist, then no other developer has checked out the file and, in step 414, the first developer can access the file (the first developer can check-out the file). If in step 410, the file selected by the first developer for check out is included in an open changelist, in step 412, the SCM application checks if the first developer is a member of the development team assigned to the open changelist. If the first developer is a member of the development team assigned to the open changelist, in step 414, the first developer can access the file. If the first developer is not a member of the development team assigned to the open changelist, or if the changelist is assigned to a second developer, in step 616, the first developer is not allowed to access the file (the first developer cannot check-out the file).

Referring to FIG. 5A, a flowchart illustrating exemplar steps 500 that can be executed to activate changelists in accordance with implementations of the present disclosure is shown. For example, the exemplar steps of FIG. 5A may be implemented using software instructions stored in a computer-readable storage medium and executed by a processing system including one or more processing apparatus, or processors.

In step 502, an SCM application that uses a modified change recording system for revision control checks for the activation of a shared changelist. For example, the SCM application can check the owner attribute of a changelist to determine the development team assigned to the shared changelist. If, in step 502, a shared changelist activation has occurred, the SCM application can check if the development team member (member) requesting the activation of the shared changelist is designated as the team list activator. For example, a system administrator for a source control management system that includes the SCM application can designate a member of a development team as the team list activator. This designation can be included in the persistent list of the development teams and the developers assigned to each development team included in a database (e.g., database 104 in FIG. 1). If, in step 504, the developer (member) requesting the shared changelist activation is not the team list activator, in step 506, the shared changelist activation will be prohibited. If, in step 504, the developer (member) requesting the shared changelist activation is designated as the team list activator, in step 508, the shared changelist activation will occur.

Referring to FIG. 5B, a flowchart illustrating exemplar steps 520 that can be executed to activate changelists in accordance with implementations of the present disclosure is shown. For example, the exemplar steps of FIG. 5B may be implemented using software instructions stored in a computer-readable storage medium and executed by a processing system including one or more processing apparatus, or processors.

In step 522, an SCM application that uses a modified change recording system for revision control checks for the activation of a shared changelist. If, in step 522, a shared changelist activation has occurred, in step 524, the SCM application verifies that none of the files to be checked in are locked by an editor for editing. If, in step 524, any of the files for check-in are locked, in step 526, the shared changelist activation will be prohibited. If, in step 524, none of the files for check-in are locked, in step 528, the shared changelist activation will occur.

Referring to FIG. 5C, a flowchart illustrating exemplar steps 540 that can be executed to activate changelists in accordance with implementations of the present disclosure is shown. For example, the exemplar steps of FIG. 5C may be implemented using software instructions stored in a computer-readable storage medium and executed by a processing system including one or more processing apparatus, or processors.

In step 542, an SCM application that uses a modified change recording system for revision control checks for the activation of a shared changelist. If in step 542, a shared changelist activation has occurred, in step 544, the developer (member) that initiated the shared changelist activation can alert other development team members of the changelist activation initiation. For example, the initiating developer (member) can notify all team members of the pending shared changelist activation even if a developer is not listed in the shared changelist as having checked out or accessed any of the source code files or objects listed in the shared changelist. In another example, the initiating developer, having knowledge of the developers (members) on the development team that accessed files and objects in the shared changelist by examining the shared changelist, may alert only those developers (members) that accessed any of the files in the shared changelist.

In step 546, if the initiating developer receives the approval of the team members (developers) alerted in step 544, in step 548 the shared changelist activation will be allowed. If, in step 546, the initiating developer does not receive the approval of the team members (developers) alerted in step 544, in step 550 the shared changelist activation will be prohibited.

Figure 6:
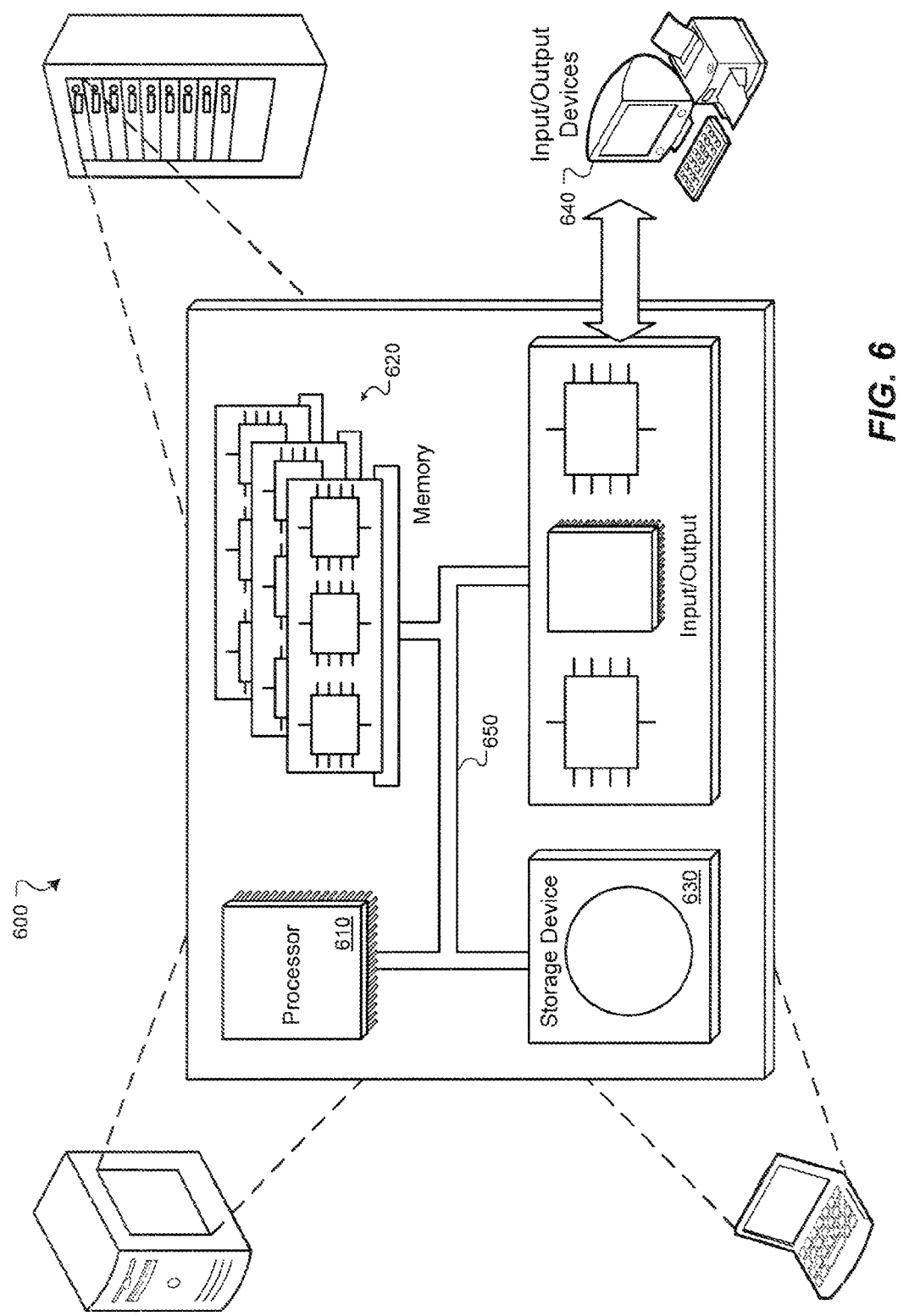
FIG. 6 is a schematic illustration of exemplar computer systems that can be used to execute implementations of the present disclosure.

Referring now to FIG. 6, a schematic illustration of exemplar hardware components 600 that can be used to execute implementations of the present disclosure is provided. The system 600 can be used for the operations described in association with the methods described in FIGS. 4 and 5A-C according to one implementation. For example, the system 600 may be included in the application server 102. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them.

The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method, comprising:
   generating a changelist corresponding to at least one computer code object that is digitally stored in a repository database;
   defining a plurality of development teams, each development team including one or more members including software developers;
   assigning a development team of the plurality of development teams to the changelist;
   determining that a first user is attempting to access the at least one computer code object using a first computer that is in communication with the repository database;
   determining that the first user is a member of the development team;
   enabling access to the at least one computer code object by the first user in response to determining that the first user is a member of the development team;
   determining that a second user is attempting to access the at least one computer code object using a second computer that is in communication with the repository database;
   determining that the second user is not a member of the development team; and
   prohibiting access to the at least one computer code object by the second user in response to determining that the second user is not a member of the development team.

2. The method of claim 1, further comprising:
   instantiating an editor program at the first computer;
   modifying the at least one computer code object using the editor program.

3. The method of claim 1, further comprising:
   determining that a third user is attempting to access the at least one computer code object using a third computer;
   determining that the third user is a member of the development team;
   determining that the first user is currently accessing the at least one computer code object; and
   prohibiting access of the third user to the at least one computer code object in response to determining that the first user is currently accessing the at least one computer code object.

4. The method of claim 1, further comprising:
   initiating activation of the changelist by a user;
   determining that the user initiating the activation is an authorized user; and
   activating the changelist in response to determining that the user initiating the activation is an authorized user.

5. The method of claim 4, further comprising:
   assigning the user to a role as an activation user; and
   determining that the user initiating the activation is an authorized user when the user is assigned as the activation user.

6. The method of claim 1, further comprising:
   initiating activation of the changelist by the first user;
   alerting a third user that activation has been initiated, the third user being a member of the development team;
   generating an approval signal based on an input of the third user; and
   activating the changelist upon generation of the approval signal.

7. The method of claim 1, further comprising:
   initiating activation of the changelist by the first user;
   activating objects of the changelist that were only modified by the first user;
   initiating activation of the changelist by a third user, the third user being a member of the development team;
   activating objects of the changelist that were only modified by the third user; and
   activating objects of the changelist that were modified by the first and third users.

8. A computer-readable storage medium coupled to one or more processors and having instructions stored thereon which, when executed by the one or more processors, cause the one or more processors to perform operations comprising:
   generating a changelist corresponding to at least one computer code object that is digitally stored in a repository database;
   defining a plurality of development teams, each development team including one or more members including software developers;
   assigning a development team of the plurality of development teams to the changelist;
   determining that a first user is attempting to access the at least one computer code object using a first computer that is in communication with the repository database;
   determining that the first user is a member of the development team;
   enabling access to the at least one computer code object by the first user in response to determining that the first user is a member of the development team;
   determining that a second user is attempting to access the at least one computer code object using a second computer that is in communication with the repository database;
   determining that the second user is not a member of the development team; and
   prohibiting access to the at least one computer code object by the second user in response to determining that the second user is not a member of the development team.

9. The computer-readable storage medium of claim 8, wherein the operations further comprise:
   instantiating an editor program at the first computer; and
   modifying the at least one computer code object using the editor program.

10. The computer-readable storage medium of claim 8, wherein the operations further comprise:
    determining that a third user is attempting to access the at least one computer code object using a third computer;

determining that the third user is a member of the development team;
determining that the first user is currently accessing the at least one computer code object; and
prohibiting access of the third user to the at least one computer code object in response to determining that the first user is currently accessing the at least one computer code object.

11. The computer-readable storage medium of claim 8, wherein the operations further comprise:
initiating activation of the changelist by a user;
determining that the user initiating the activation is an authorized user; and
activating the changelist in response to determining that the user initiating the activation is an authorized user.

12. The computer-readable storage medium of claim 11, wherein the operations further comprise:
assigning the user to a role as an activation user;
determining that the user initiating the activation is an authorized user when the user is assigned as the activation user.

13. The computer-readable storage medium of claim 8, wherein the operations further comprise:
initiating activation of the changelist by the first user;
alerting a third user that activation has been initiated, the third user being a member of the development team;
generating an approval signal based on an input of the third user; and
activating the changelist upon generation of the approval signal.

14. The computer-readable storage medium of claim 8, wherein the operations further comprise:
initiating activation of the changelist by the first user;
activating objects of the changelist that were only modified by the first user;
initiating activation of the changelist by a third user, the third user being a member of the development team;
activating objects of the changelist that were only modified by the third user; and
activating objects of the changelist that were modified by the first and third users.

15. A system, comprising:
a database having a plurality of computer code objects stored thereon; and
a plurality of computers that are in communication with the database to enable respective users of the computers to access the objects; and
one or more processors operable to execute instructions to cause the one or more processors to perform operations comprising:
defining a plurality of development teams, each development team including one or more members including software developers;
assigning a development team of the plurality of development teams to a changelist;
determining that a first user is attempting to access the at least one computer code object using a first computer that is in communication with the repository database;
determining that the first user is a member of the development team;
enabling access to the at least one computer code object by the first user in response to determining that the first user is a member of the development team;
determining that a second user is attempting to access the at least one computer code object using a second computer that is in communication with the repository database;
determining that the second user is not a member of the development team; and
prohibiting access to the at least one computer code object by the second user in response to determining that the second user is not a member of the development team.

16. The system of claim 15, wherein the operations further comprise:
instantiating an editor program at the first computer; and
modifying the at least one computer code object using the editor program.

17. The system of claim 15, wherein the operations further comprise:
determining that a third user is attempting to access the at least one computer code object using a third computer;
determining that the third user is a member of the development team;
determining that the first user is currently accessing the at least one computer code object; and
prohibiting access of the third user to the at least one computer code object in response to determining that the first user is currently accessing the at least one computer code object.

18. The system of claim 15, wherein the operations further comprise:
initiating activation of the changelist by a user;
determining that the user initiating the activation is an authorized user; and
activating the changelist in response to determining that the user initiating the activation is an authorized user.

19. The system of claim 18, wherein the operations further comprise:
assigning the user to a role as an activation user;
determining that the user initiating the activation is an authorized user when the user is assigned as the activation user.

20. The system of claim 15, wherein the operations further comprise:
initiating activation of the changelist by the first user;
alerting a third user that activation has been initiated, the third user being a member of the development team;
generating an approval signal based on an input of the third user; and
activating the changelist upon generation of the approval signal.

21. The system of claim 15, wherein the operations further comprise:
initiating activation of the changelist by the first user;
activating objects of the changelist that were only modified by the first user;
initiating activation of the changelist by a third user, the third user being a member of the development team;
activating objects of the changelist that were only modified by the third user; and
activating objects of the changelist that were modified by the first and third users.

\* \* \* \* \*